SAX & KEAR.
Car Wheel.
No. 88,743.  Patented April 6, 1869.
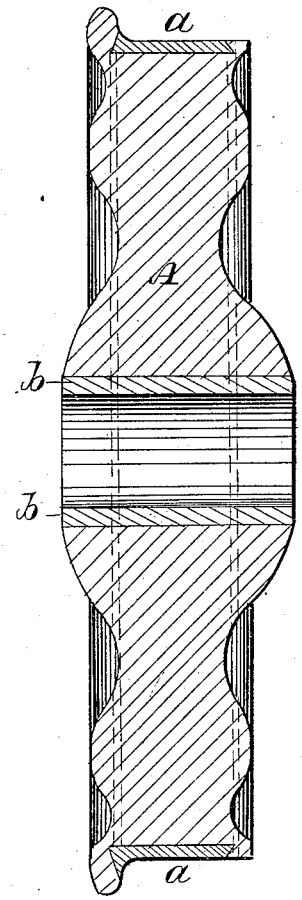
Witnesses  Inventor
 John R. Sax
 G. W. Kear
 per
 Alexander Mason
 Attys.

UNITED STATES PATENT OFFICE.

JOHN K. SAX AND GEORGE W. KEAR, OF KINGSTON, PENNSYLVANIA.

IMPROVED RAILWAY-CAR WHEEL.

Specification forming part of Letters Patent No. 88,743, dated April 6, 1869.

*To all whom it may concern:*

Be it known that we, JOHN K. SAX and GEORGE W. KEAR, of Kingston, in the county of Luzerne, and in the State of Pennsylvania, have invented certain new and useful Improvements in Car-Wheels; and do hereby declare that the following is a full, clear, and exact description thereof, reference being had to the accompanying drawings, and to the letters of reference marked thereon.

The nature of our invention consists in providing a common cast-iron wheel with a band of steel around the tread, covering the wearing-surface, also with a wrought-iron ring in the hub.

In order to enable others skilled in the art to which our invention appertains to make and use the same, we will now proceed to describe its construction and operation, referring to the annexed drawings, which form a part of this specification, and which represent a vertical section of the wheel.

A represents a common cast-iron wheel, which is provided with a band, $a$, of steel of suitable width and thickness, firmly welded to the tread of the wheel, and both edges of this steel band are dovetailed into the cast-iron, thus covering the wearing-surface of the wheel. This wheel, so constructed, is not subject to any annealing process, as there is no strain caused by the sudden chilling of the rim of the wheel. We also place a wrought-iron ring, $b$, in the hub of the wheel, to take off the strain caused by putting wheels on the axle with the hydraulic press.

Having thus fully described our invention, what we claim as new, and desire to secure by Letters Patent, is—

The circumferential steel band $a$, dovetailed and welded into a groove in the cast-iron wheel A, substantially as set forth.

In testimony that we claim the foregoing we have hereunto set our hands this 25th day of November, 1868.

JOHN K. SAX.
GEORGE W. KEAR.

Witnesses:
C. A. ZIEGLER,
T. RICHARDSON.